(12) United States Patent
Budgett et al.

(10) Patent No.: US 10,056,784 B2
(45) Date of Patent: Aug. 21, 2018

(54) INDUCTIVE POWER TRANSFER CONTROL USING ENERGY INJECTION

(71) Applicant: Auckland UniServices Limited, Auckland (NZ)

(72) Inventors: David Mortimer Budgett, Pt Chevalier (NZ); Aiguo Hu, Epsom (NZ); Ho Yan (Alex) Leung, Ellerslie (NZ); John Daniel McCormick, Oneroa (NZ)

(73) Assignee: Auckland UniServices Limited, Auckland (NZ)

( * ) Notice: Subject to any disclaimer, the term of this patent is extended or adjusted under 35 U.S.C. 154(b) by 149 days.

(21) Appl. No.: 14/432,120

(22) PCT Filed: Oct. 1, 2013

(86) PCT No.: PCT/NZ2013/000184
§ 371 (c)(1),
(2) Date: Mar. 27, 2015

(87) PCT Pub. No.: WO2014/054953
PCT Pub. Date: Apr. 10, 2014

(65) Prior Publication Data
US 2015/0244177 A1    Aug. 27, 2015

(30) Foreign Application Priority Data

Oct. 1, 2012   (NZ) ........................................ 602767
Oct. 9, 2012   (NZ) ........................................ 602903

(51) Int. Cl.
*H02J 7/00*      (2006.01)
*H02J 7/14*      (2006.01)
(Continued)

(52) U.S. Cl.
CPC .............. *H02J 50/12* (2016.02); *H01F 38/14* (2013.01); *H02J 5/005* (2013.01); *H02J 7/025* (2013.01); *H02J 17/00* (2013.01); *H02J 50/10* (2016.02); *H02J 50/40* (2016.02); *H02J 50/80* (2016.02); *H02J 50/90* (2016.02); *H02M 3/158* (2013.01); *H02M 3/3376* (2013.01); *H02M 2001/0058* (2013.01); *Y02B 70/1433* (2013.01); *Y02B 70/1491* (2013.01)

(58) Field of Classification Search
USPC ................................. 320/108, 137, 153, 162
See application file for complete search history.

(56) References Cited

U.S. PATENT DOCUMENTS

2009/0038623 A1* 2/2009 Farbarik .................. A61F 2/02
                                                        128/848
2010/0219796 A1* 9/2010 Kallmyer ............. A61N 1/3787
                                                        320/153

(Continued)

FOREIGN PATENT DOCUMENTS

| CN | 102204074 | 9/2011 |
| WO | WO-2010062201 | 6/2010 |
| WO | WO-2014/054953 | 4/2014 |

OTHER PUBLICATIONS

"International Application No. PCT/NZ2013/000184, International Search Report and Written Opinion dated Jan. 21, 2014", (Jan. 21, 2014), 11 pgs.

(Continued)

*Primary Examiner* — Alexis Pacheco
(74) *Attorney, Agent, or Firm* — Schwegman Lundberg & Woessner, P.A.

(57) ABSTRACT

The invention relates to inductive power transfer (IPT) systems, and has particular relevance to control of IPT systems, and to operation of IPT system primary power supplier. There is provided a method for controlling an IPT system primary power supply having a switched resonant circuit; the method comprising: determining the value of a parameter of the system; determining an energy injection switching pattern having a duration dependent on the parameter value; controlling the resonant circuit according to the determined energy injection switching pattern.

15 Claims, 7 Drawing Sheets

(51) Int. Cl.

| | |
|---|---|
| *H02J 50/12* | (2016.01) |
| *H02J 50/80* | (2016.01) |
| *H02J 50/90* | (2016.01) |
| *H02J 50/40* | (2016.01) |
| *H02M 3/337* | (2006.01) |
| *H02J 5/00* | (2016.01) |
| *H01F 38/14* | (2006.01) |
| *H02J 7/02* | (2016.01) |
| *H02J 17/00* | (2006.01) |
| *H02M 3/158* | (2006.01) |
| *H02J 50/10* | (2016.01) |
| *H02M 1/00* | (2006.01) |

(56) References Cited

U.S. PATENT DOCUMENTS

| | | | | |
|---|---|---|---|---|
| 2012/0119588 A1* | 5/2012 | Baarman | ................ | H02J 5/005 307/104 |
| 2012/0146575 A1* | 6/2012 | Armstrong | ............. | H02J 7/025 320/108 |
| 2012/0235507 A1* | 9/2012 | Choi | ...................... | H02J 5/005 307/104 |
| 2014/0055088 A1* | 2/2014 | Joshi | ...................... | H02J 7/025 320/108 |

OTHER PUBLICATIONS

Li, Hao Leo, "High Frequency Power Converters Based on Energy Injection Control for IPT Systems", Doctoral Thesis, Department of Electrical and Computer Engineering, The University of Auckland, New Zealand, Jan. 2011, (Jan. 2011), 216 pgs.
"International Application No. PCT/NZ2013/000184, International Preliminary Report on Patentability dated Apr. 7, 2015", 8 pgs.
"European Application No. 13843553.2, Extended European Search Report dated Apr. 26, 2016", (Apr. 26, 2016), 7 pgs.
"Chinese Application No. 201380051407.0, Notification of the First Office Action dated Sep. 2, 2016", (Sep. 2, 2016), 8 pgs.

* cited by examiner

--PRIOR ART--

INDUCTIVE POWER TRANSFER CONTROL USING ENERGY INJECTION

PRIORITY CLAIM TO RELATED APPLICATIONS

This application is a U.S. national stage application filed under 35 U.S.C. § 371 from International Application Serial No. PCT/NZ2013/000184, which was filed Oct. 1, 2013, and published as WO 2014/054953 on Apr. 10, 2014, and which claims priority to New Zealand Application No. 602767, filed Oct. 1, 2012, and to New Zealand Application No. 602903, filed Oct. 9, 2012, which applications and publication are incorporated by reference as if reproduced herein and made a part hereof in their entirety, and the benefit of priority of each of which is claimed herein.

FIELD OF THE INVENTION

This invention relates to inductive power transfer (IPT) systems, and has particular relevance to control of IPT systems, and to operation of IPT system primary power supplies.

BACKGROUND

Inductive power transfer (IPT) systems are well known. An example of a typical IPT system is shown in FIG. 1 in which a power supply 1 which is typically provided in the form of a converter, energises a primary conductive path or track 2. The power supply typically generates a high frequency current along the track 2, which is usually a discrete coil, but may in other embodiments comprise a single loop. The magnetic field generated in the track 2 enables a pick up coil 3 of a pick up device 4 to be coupled inductively to the track. The pick up 4 includes control circuitry 5 which conditions power received so as to provide an appropriate power supply to load 6.

To generate the high frequency current in track 2, the operating frequency of switches in the power supply 1 is usually made to be equal to the actual system frequency. This makes the controller design for these power supplies complicated and costly. In practice, controlling the power available to a pick up 4 can be problematic, and in existing systems attempts to provide adequate control can result in unpredicted voltage and current overshoots during load transients or start up situations. These can damage the switching devices or other components in the system.

SUMMARY OF THE INVENTION

It is an object of the present invention to provide an improved IPT system control method or apparatus, or to provide an approved IPT system power supply, or to provide an improved IPT system which at least ameliorates one or more of the disadvantages of known systems, or at least provides a useful alternative.

Accordingly, in one aspect, the invention broadly consists in a method for controlling an IPT system primary power supply having a switch resonant circuit, the method including the steps of:
1.) determining an error by comparing the value of a parameter of the system with a required value;
2.) Using the magnitude of the error to determine an energy injection switching sequence for switching the resonant circuit, by determining a) the number of energy injection events in the injection sequence and b) determining the distribution of energy injection events in the sequence.

In one embodiment the parameter is indicative of a power output or power availability. This could be the output or load voltage on the secondary.

In one embodiment the parameter is the power available from the primary power supply. This may be measured as a voltage in one example, or could be measured using another parameter. Similarly, in one embodiment the output of the primary power supply is the power available from the power supply, but could alternatively be another parameter.

In one embodiment the error comprises an error signal. In other embodiments, the error is calculated and comprises data which is used in a processor to implement a control algorithm.

In one embodiment the required output comprises a required output of an IPT pick up which the primary power supply supplies. Similarly, the output of the primary power supply may in some embodiments comprise an output of an IPT pick up which is being supplied by the primary power supply.

Preferably a processor is used to determine the energy injection switching sequence, and/or the number of energy injection events in the injection sequence, and/or the distribution of energy injection events in the sequence.

In another aspect the invention broadly consists in control means for an IPT system primary power supply having a switched resonant circuit, the control means including
1. Means to determine an error signal by comparing the value of a parameter of the system with a required value.
2. Means to determine an energy injection sequence by using the magnitude of the error signal for switching the resonant circuit, by determining a) the number of energy injections events in the injection sequence and b) determining the distribution of energy injection events in the sequence.

In one embodiment the parameter is indicative of a power output or power availability.

In one embodiment the required output is the power available from the primary power supply. This may be measured as a voltage in one example, or could be measured using another parameter. Similarly, in one embodiment the output of the primary power supply is the power available from the power supply, but could alternatively be another parameter.

In one embodiment the error comprises an error signal. In other embodiments, the error is calculated and comprises data which is used in a processor to implement a control algorithm.

In one embodiment the required output comprises a required output of an IPT pick up which the primary power supply supplies. Similarly, the output of the primary power supply may in some embodiments comprise an output of an IPT pick up which is being supplied by the primary power supply.

Preferably a processor is used to determine the energy injection switching sequence, and/or the number of energy injection events in the injection sequence, and/or the distribution of energy injection events in the sequence.

In the further aspect the invention broadly consists in an IPT system including a controller according to the previous statement of invention.

In another aspect there is provided a method for controlling an IPT system primary power supply having a switched resonant circuit; the method comprising: determining the value of a parameter of the system; determining an energy injection switching pattern having a duration dependent on the parameter value; controlling the resonant circuit according to the determined energy injection switching pattern.

In use, the IPT primary power supply will be located in proximity with an IPT secondary pick-up circuit for transferring power to a connected load. Such an arrangement allows for easily adapting to changes in the coupling conditions, such as distance between coils, as well as loading conditions on the secondary. A shorter duration pattern allows for adapting rapidly to such transients, whilst a longer duration patterns allows for finer control of the power transfer in order to more closely align with the set-point and increases efficiency. In particular losses and heating can be reduced. The flexibility of control provided by various duration patterns also allows for supporting greater coupling gaps. In addition, by increasing efficiency and more flexible management of the system, the stresses on circuit components such as switches and capacitors are reduced, thereby either extending their effective life, or allowing component de-rating and hence cheaper provision. The greater flexibility provided also enables system designs in which switching components in the secondary can be reduced, thereby extending secondary life and reliability. This may be particularly important in applications such as implantable medical devices.

In an embodiment the number and/or distribution of energy injection events in the injection switching patterns is dependent on the parameter value.

In an embodiment the distribution of energy injection events in a series of patterns is changed, whilst maintaining the same number of energy injection events in each pattern in the series. By maintaining the same number of injection events but varying the pattern, the power transferred is constant and a communication channel is created by the ability to detect the pattern series. This can be used to send digital information. The modulation of the power transferred may alternatively be used to vary and/or reduce the electromagnetic noise generated by the power system. This may be particularly advantageous when deployed in sensitive environments.

In an embodiment the duration comprises a pattern length having a number of cycles of the resonant frequency of the circuit. The number of cycles of the pattern length may be a predetermined number when the parameter value is below a threshold and a higher number otherwise. Such an arrangement allows the system to revert to a short pattern for handling transient conditions such as a sudden change in loading of the secondary, or a change in the coupling for example by variation in the distance between primary and secondary coils.

Embodiments may provide for a number of switching patterns having different numbers of cycles in order to handle different conditions. Selecting or switching between these patterns may be directly dependent on changes in the parameter value, or selecting a new pattern may depend on the variation in the parameter value over time. Thus for example, as the system appears to stabilise after a transient condition, longer and longer duration patterns may be selected.

In an embodiment the resonant circuit is controlled dependent on an error determined by comparing the value of a parameter of the system with a required value.

The parameter of the system may be indicative of a power output or power availability.

In an embodiment, the IPT system primary supply is used to charge an implanted medical device.

In another aspect there is provided an IPT system primary power supply having a switched resonant circuit, and comprising: means for determining the value of a parameter of the system; means for determining an energy injection switching pattern having a duration dependent on the parameter value; means for controlling the resonant circuit according to the determined energy injection switching pattern.

There may also be provided an IPT system having the IPT system primary power supply and a secondary pick-up for wirelessly transferring power to a load connected to the secondary. An example load is an implanted device such as a power source for a heart pump.

In an embodiment the switched resonant circuit has a plurality of switches controlled by the determined energy injection switching pattern.

In an embodiment the number and/or distribution of energy injection events in the injection switching patterns is dependent on the parameter value. The energy injection events may be dependent on the resonant frequency cycles of the switched resonant circuit.

In an embodiment the IPT system primary power supply further comprises means for determining an error by comparing the value of a parameter of the system with a required value, and the means for determining an energy injection switching pattern is arranged to determine the duration dependent on the error.

In an embodiment the duration comprises a pattern length having a number of cycles of the resonant frequency of the circuit, and wherein the pattern comprises a number and/or distribution of energy injection events in the injection switching patterns is dependent on the parameter value, the energy injection events being dependent on the resonant frequency cycles.

In another aspect there is provided a computer program for implementing a method for controlling an IPT system primary power supply having a switched resonant circuit; the method comprising: determining the value of a parameter of the system; determining an energy injection switching pattern having a duration dependent on the parameter value; controlling the resonant circuit according to the determined energy injection switching pattern.

The computer program may be implemented in a computer program product, which may be non-transitory such as a CD-ROM or transitory such as a carried over an RF signal or downloaded from the Internet.

In another aspect there is provided a method for controlling an IPT system secondary pickup coupled to an IPT system primary power supply, the pickup having a switched resonant circuit; the method comprising: determining the value of a parameter of the system; determining an energy regulating switching pattern having a duration dependent on the parameter value; controlling the resonant circuit according to the determined energy regulating switching pattern.

This is similar in principle to injecting energy into the primary, but instead uses the same type of switching control to regulate the supplied power for changing load conditions. This may be achieved by shorting or opening the secondary circuit according to the switching pattern. This may be used in conjunction with a primary using or not using the above defined energy injection switching pattern.

In another aspect there is provided a method for controlling an IPT system primary power supply having a switched resonant circuit; the method comprising: selecting one of a number of energy injection switching patterns in response to a control signal; wherein the energy patterns having the same number of energy injection events but different distributions of energy injection events; controlling the switched resonant circuit in accordance with the selected switching pattern.

In an embodiment, the control signal is arranged to modulate the selection of switching patterns in response to a communications signal in order to transmit a message to the secondary. Alternatively or additionally, the change in switching patterns may be controlled in order to reduce or change electromagnetic noise.

A range of durations, windows cycles of patterns may be appropriate for communications.

In an embodiment the secondary is also controlled by a method of selecting switching patterns for regulating the secondary power, and comprises selecting one of a number of energy injection switching patterns in response to a control signal; wherein the energy patterns having the same number of energy injection events but different distributions of energy injection events; controlling the switched resonant circuit in accordance with the selected switching pattern.

By utilising this arrangement on both the primary and secondary sides, duplex communications is possible, and may be used for transferring information to connected devices to control the primary and secondary themselves, for example by adjusting the resonant frequency in response to changing coupling or load conditions.

In another aspect there is provided an IPT system comprising any combination of the IPT primary and/or secondary arrangements previously defined or further described herein.

The invention broadly consists in any novel feature, or any novel combination of features disclosed herein.

Further aspects of the invention will become apparent from the following description.

DRAWING DESCRIPTION

Figure 5:
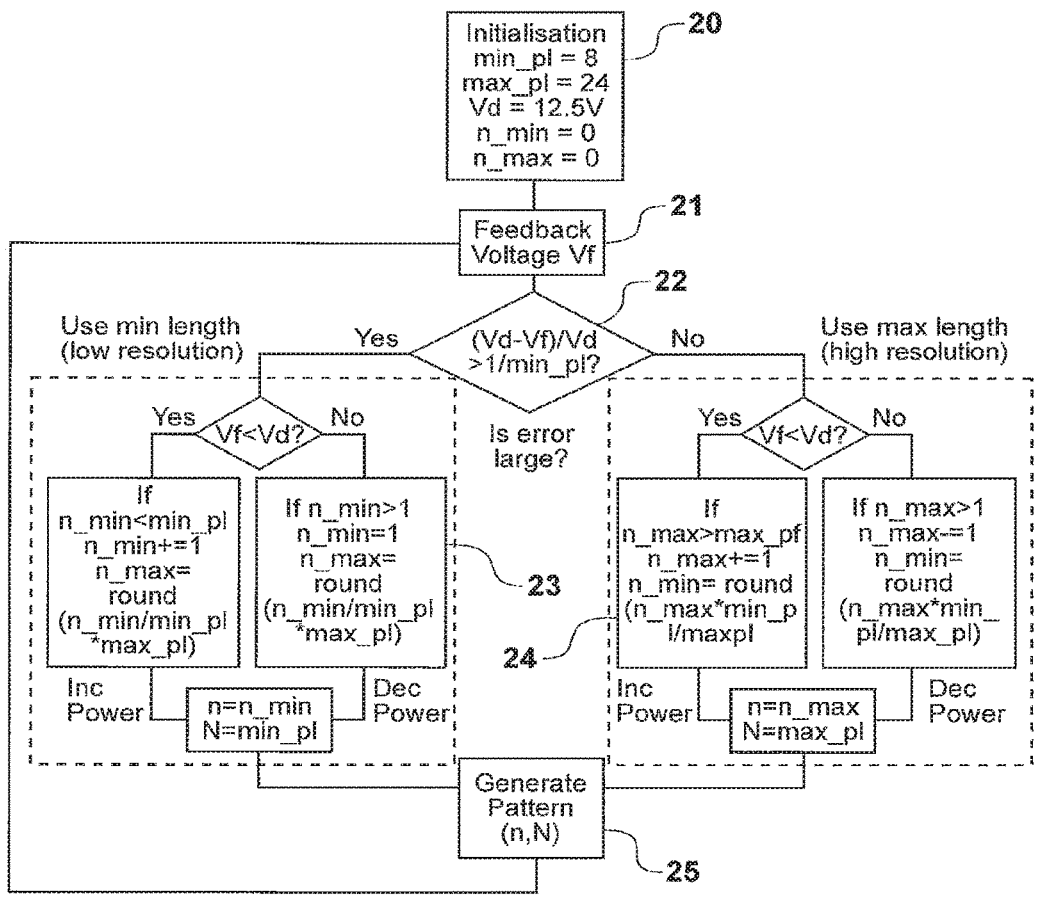
Figure 6:
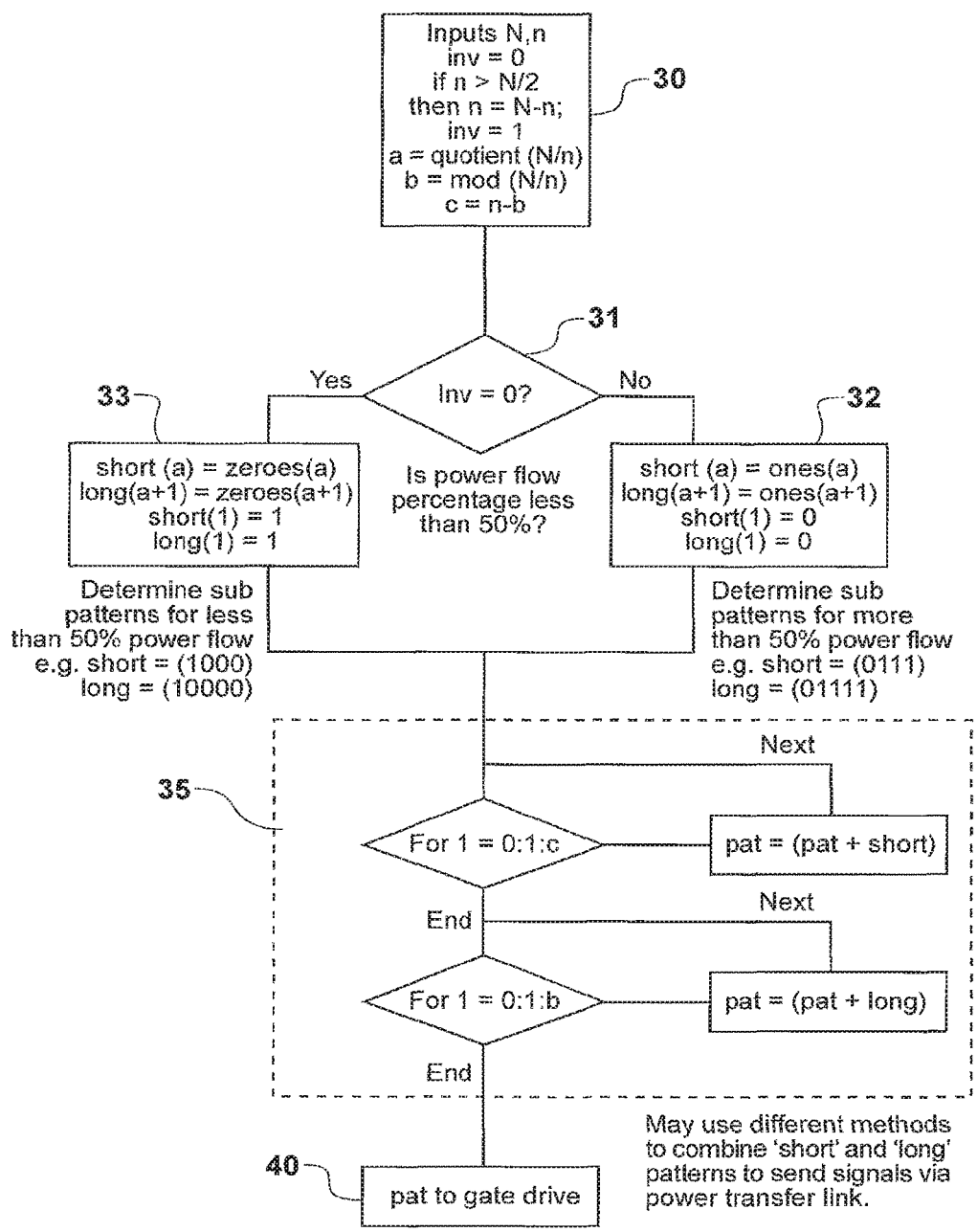
Figures 7A, 7B:
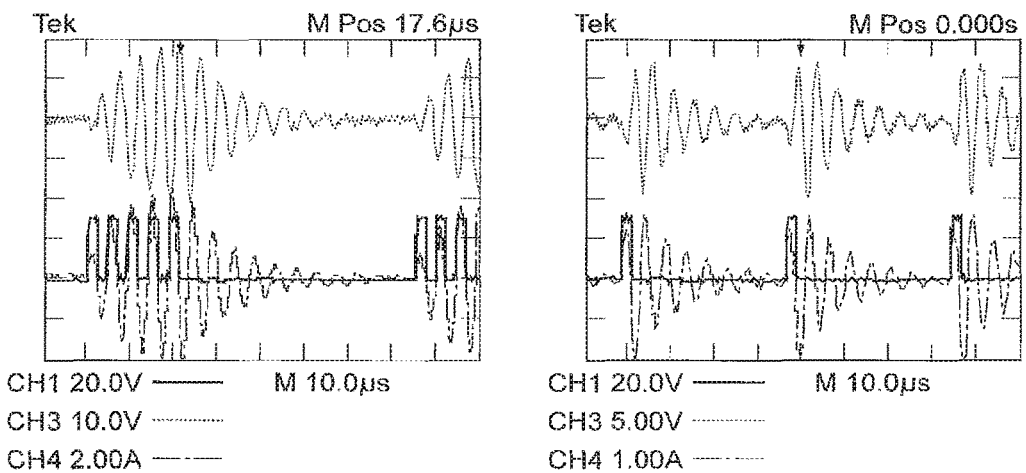
Figure 8:
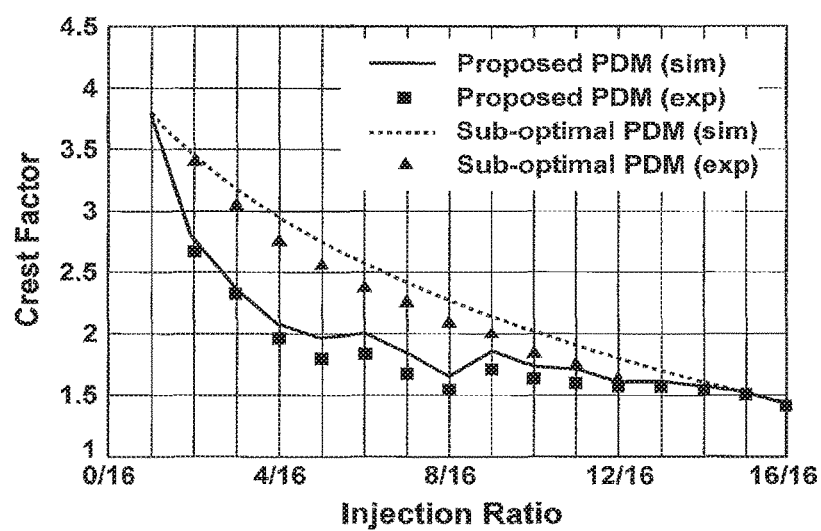
Figure 9:
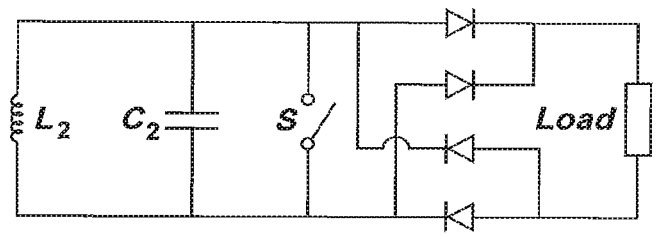
Figure 10:
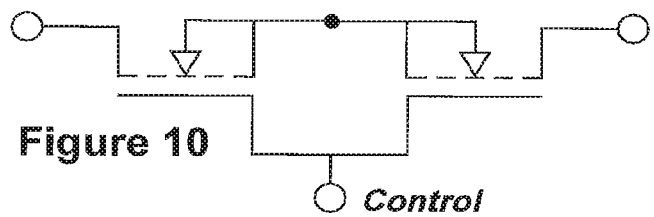
Figure 11:
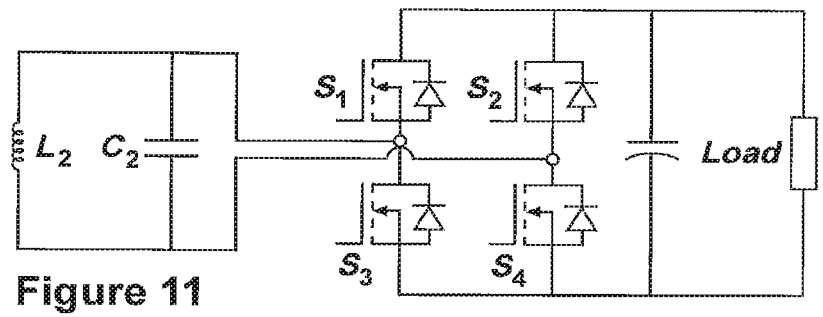
Figure 12:
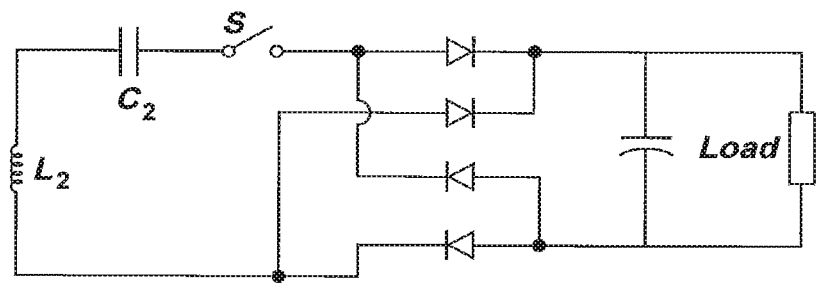

FIG. 5 is a flow chart of an energy injection switching pattern resolution or duration controller according to an embodiment FIG. 6 is a flow chart of a pattern generator controlling the distribution of energy injection events within a pattern according to an embodiment FIGS. 7a and 7b shows the minimum injection ratios for energy injection switching patterns FIG. 8 shows crest factors for different patterns FIG. 9 shows a shorting control circuit FIG. 10 shows a power switch implementation FIG. 11 shows an alternative shorting control circuit FIG. 12 shows an opening control circuit

DESCRIPTION OF ONE OR MORE PREFERRED EMBODIMENTS

The invention proposes a new form of control for IPT systems, or IPT primary power supplies, in which discrete energy injection is used to control the primary power controller and thus control the IPT system as required. In particular, energy injection according to the present invention allows the power available to one or more pick ups to be controlled, as will be described further below.

Figure 1:
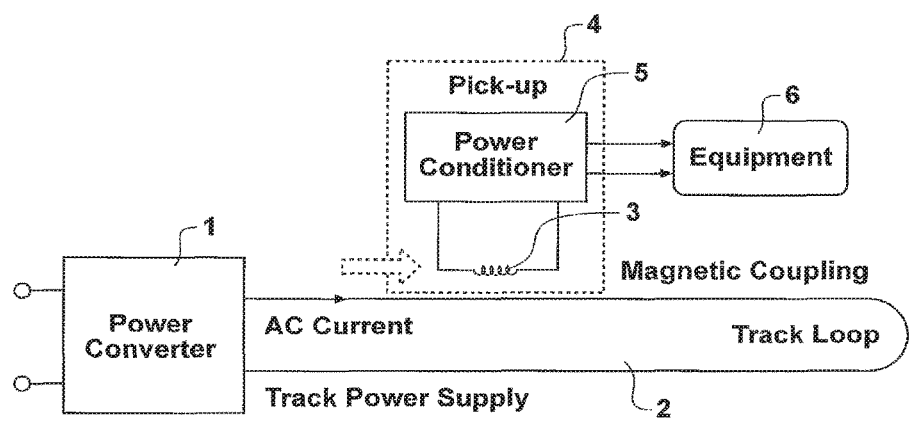
FIG. 1 is a schematic of a known typical conductive power transfer system configuration.
Figure 2:
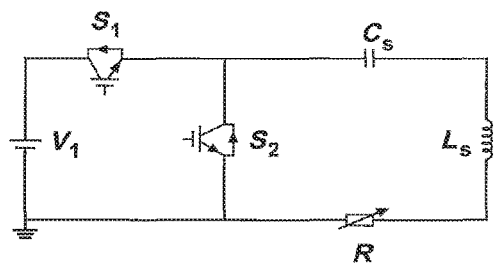
FIG. 2 is a circuit schematic of a proposed converter for use with an IPT primary power supply

Referring to FIG. 2, one example of a power converter for use according to the present invention is shown. Switches $S_1$ and $S_2$ are connected as shown with a resonant circuit comprising inductance $L_S$ and capacitance C. In practice, inductance $L_S$ comprises the track 2 as described with reference to FIG. 1, and capacitance CS is selected to tune the track at a desired resonant frequency. Load resistor R represents a variable load. As will be appreciated by a person skilled in the art the switches $S_1$ and $S_2$ may be operated to allow the resonant circuit to resonant.

For example, when switch $S_1$ is controlled to an on state, the source voltage VDC is applied to the resonant circuit and energy is injected in to the track. After capacitor $C_S$ is fully charged a free oscillation path for the track current is formed if $S_1$ is turned off and $S_2$ is turned on. The current freely oscillates in the track loop and the energy transfers indefinitely between $C_S$ and $L_S$, assuming there is no load to damp the oscillation. In practice, damping does exist which cause the energy in the track loop to be eventually consumed. It can be seen that at each injection period, $S_1$ is controlled to be on and $S_2$ off so that energy is injected into the network.

Figure 3:
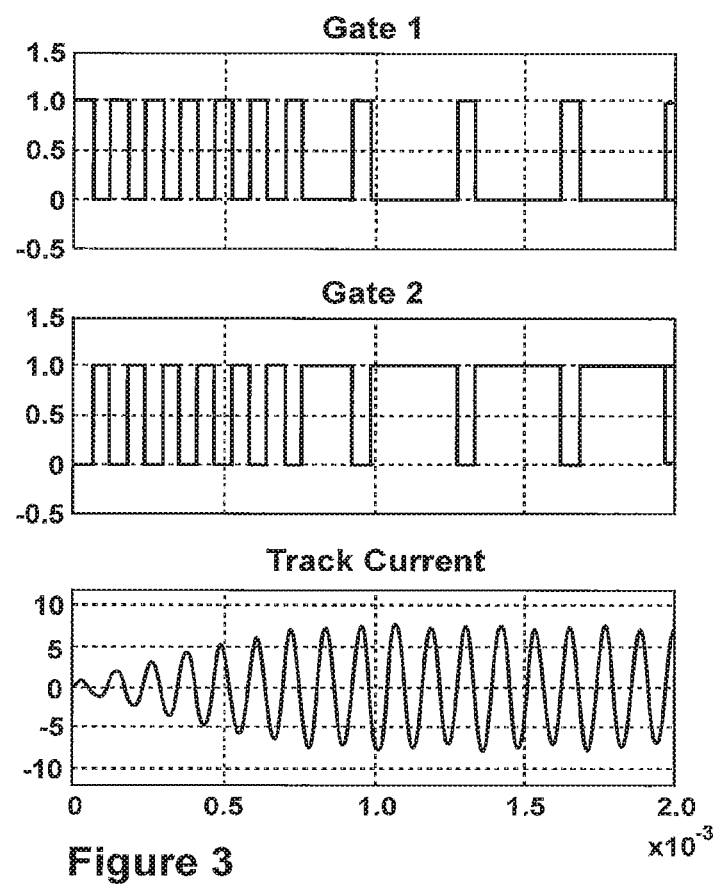
FIG. 3 shows general gate and track currents for a converter according to FIG. 2

The injected energy depends on the input DC voltage and the injection time period which is the time for each energy injection event. If switch $S_1$ is on and switch $S_2$ is off during every positive half cycle to the track current then the voltage added to the track loop reaches its maximum value very quickly. This is demonstrated in FIG. 3 in which the diagram for gate 1 effectively represents switch 1 of FIG. 2 and gate 2 effectively represents switch 2 of FIG. 2 (as is further illustrated in FIG. 4). Each switching period is of a duration corresponding to the resonant frequency of the resonant circuit. Therefore, in the initial part of the sequence up to a time period 0.5 as shown in FIG. 3, gate 1 is on for one half of a cycle of the resonant current in the track and is then switched off for the next half cycle while gate 2 is switched on.

In the second part of the sequence gate 1 is on for one half of a cycle of the resonant current in the track and is then switched off for the next seven half cycles while gate 2 is switched on. The first part of the sequence represents an energy injection switching pattern which has one energy injection event per cycle for a given number of cycles of the pattern length or duration. In the example of FIG. 3, the pattern length is seven cycles and the energy injection switching pattern has a duration of 0.8 milliseconds. The second pattern has an energy injection event every third cycle with a pattern length of twelve cycles or 1.2 milliseconds. These energy injections switching patterns can be controlled using appropriate binary sequences input to the gates, for example the above described first switching pattern having an input for gate 1 of 101010101010, and the second switching pattern having an input for gate 1 of 100000100000100000100000; with complimentary patterns for gate 2. Being able to adjust the duration or number of cycles of the pattern length enables the embodiment to adapt to changes in coupling conditions such as changing distance between the coils and/or changing loading conditions on the secondary. A shorter duration pattern allows for adapting rapidly to such transients, whilst a longer duration pattern allows for finer control of the power transfer in order to increase efficiency and reduce stresses on switching components amongst other advantages.

In the embodiment different energy injection switching patterns can be used depending on the value of a parameter of the system, for example the secondary load voltage which may be fed back to the primary controller using a wireless communication signal. Another system parameter that can be determined alternatively or in addition is the current in the primary resonant circuit. The duration of the energy injection switching patterns are controlled dependent on the value of the parameter of the system, the resonant circuit being controlled according to the determined energy injection switching pattern. By controlling the resonant circuit dependent on the measured or otherwise determined value of the system parameter, the energy injection switching pattern can be optimised according to the current conditions of the IPT system, including load and coupling conditions. Changes or transients in these conditions such as the primary and secondary windings being separated causes corresponding changes in the system parameter which can then be used to adjust the duration of the energy injection switching pattern used to control the resonant circuit. Thus for example under transient conditions such as changing separation of primary and secondary coils, an energy injection switching pattern having a shorter duration can be selected which enables the system to quickly adapt to the changing conditions, albeit at some loss of efficiency. When the determined system parameter is stable for a pre-determined period of time, and/or the parameter approaches a preferred set point such as a preferred secondary voltage output, the energy injection switching pattern may be changed to have a longer duration which enables finer control of the IPT system in order to increase efficiency.

By controlling the energy injection switching pattern, the power flow can be controlled with minimum component stress. This leads to higher efficiency and allows the choice of lower rated components whilst reducing power loss. Furthermore when compared with frequency regulation, energy injection regulation can control power flow over a wider range of coil coupling (separation). The pattern generator can further improve the control range by dictating switching at extreme coupling conditions when other control modes collapse. Finer control resolution can be obtained by increasing pattern lengths beyond what is obtainable from other control methods or by combining successive patterns to arrive at output powers which possess an output power which is a combination of the individual patterns output power. The use of dynamic pattern length or generation improves transient performance. For example during start up or other large transient power changes the pattern generator can improve its transient performance by reducing the injection pattern length. This allows faster regulation to the approximate output power when the injection pattern length can be increased for finer control resolution. The embodiment can also provide reduced electromagnetic noise as there are many patterns which lead to the same power transferred. The controller can randomly (or otherwise) select from these similar patterns of injection cycles to spread the electrical noise across a broad frequency range. The embodiment also provides improved robustness as the pattern generator can be tolerant to feedback delay from the secondary which can be much longer than the time constant of the resonant circuit. Other control methods can become unstable under these circumstances. Furthermore the embodiment does not require additional switching/power components beyond what is required for a conventional converter.

A further alternative determination of the energy injection switching pattern may be dependent on an error determined by comparing the value of the system parameter with a required value or set point. For example an error voltage may be generated when comparing the actual secondary output voltage with a target output voltage. A large error voltage then causes the resonant circuit to be controlled using shorter patterns which allow for a faster transient response in order to allow the IPT system to reach steady state more quickly. A small error voltage then allows for a longer energy injection switching pattern to be used to control the resonant circuit.

Figure 4:
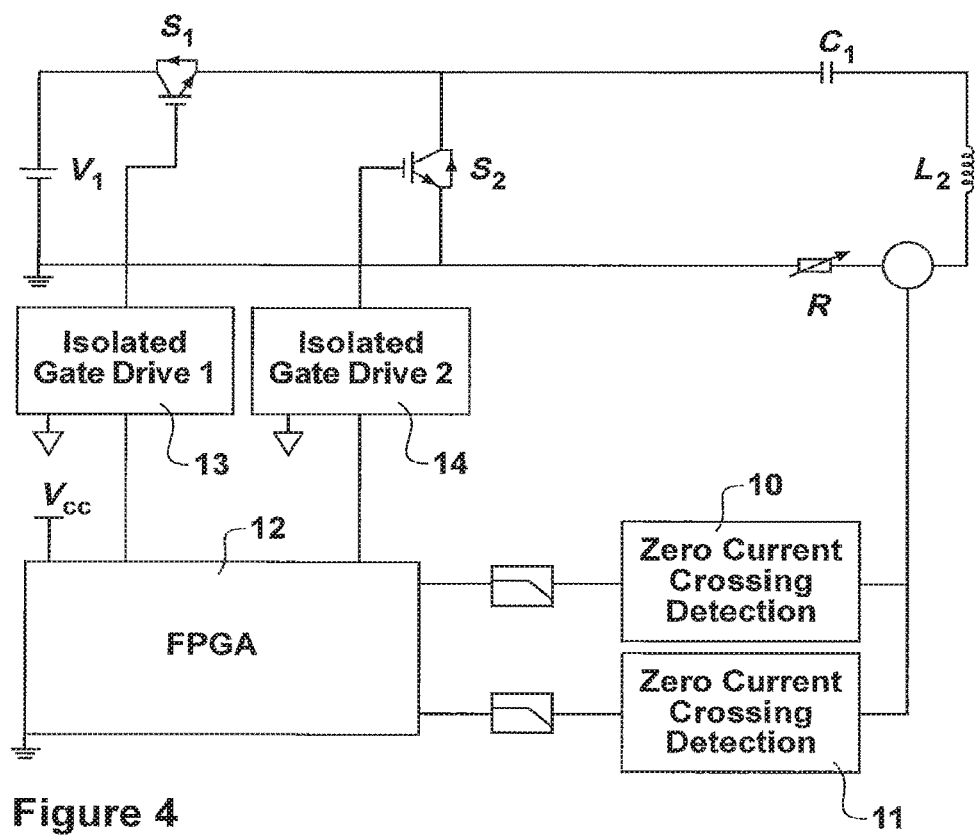
FIG. 4 shows an implementation diagram for a converter according to FIG. 2

A practical control arrangement is shown in FIG. 4 in which the zero current crossing detector 10 and a maximum current detector 11 provide input signals as to the condition of the track current to a field programmable gate array 12 which provides control signals to gate drive circuits 13 and 14 that activate switches S1 and S2 respectively.

The field programmable gate array 12 may include software which implements algorithms discussed with reference to FIGS. 5 and 6 below. The track current, voltage, or available power may be monitored and correspond with a required current, voltage or power so that an error indication can be determined for control purposes. Alternatively, the same or similar parameters may be measured on one or more pick-ups for control purposes.

In another embodiment the field programmable gate array 12 is replaced by either a lower cost microprocessor to implement simple algorithms, or discrete logic to implement a fixed algorithm.

With reference to FIG. 5 a pattern generator algorithm accepts two inputs to generate a gate driving pattern. The first input N is the overall length or duration of the energy injection switching pattern. This may be chosen to be any convenient number and may be selected dependent upon the control "resolution" which is required. This can be determined using a system parameter such as the secondary output or load voltage.

Referring now to FIG. 5, the parameters described in the flow chart are set out below The objective of the algorithm in FIG. 5 is to provide an overall pattern length of injection events. A pattern is used to drive gate drive circuits such as those shown in FIG. 4. The pattern comprises a series of energy injection events. The number of energy injection events (in this example each energy injection event corresponds to Gate 1 being switched on for one half cycle of the resonant current in the track) is represented by n. The number of possible energy injection events is N. The minimum possible pattern length and the maximum pattern length can be set by a user. Initialization occurs in step 20 the feedback voltage can be representative of the power available at a pick up (and could also be another parameter being measured such as a current in the track for example). The feedback voltage is then compared with the desired output voltage in step 22 in order to determine an error. Once again, the desired output voltage may be representative of the desired or required power necessary to operate a pick up device, or could be a measurement of a track parameter). If the error is large, then the sub flow diagram 23 is followed. As can be seen, this reduces the pattern length so that a lower resolution, or coarser, control strategy is adopted to generate the resultant pattern in step 25. An example of an extremely coarse pattern which may be required if a sudden increase in power or voltage is necessary would be a sequence of four ones for example. Similarly, if the error is not large, then the algorithm shown in sub portion 24 of the flow chart is implemented, which will result in a longer pattern length giving a greater "resolution" i.e. a finer control.

In the sub portions 23 and 24 of the algorithm, corresponding to the shorter and longer pattern durations respectively, the transfer power can be increased or decreased as required by the load. For example referring to sub portion 23, if the feedback voltage Vf is smaller than the desired output voltage Vd, the power transferred is increased by increasing the number of energy injection events, whereas if the feedback voltage is greater than the desired voltage than the number of energy injection events in the shorter pattern is reduced. Thus sub portion 23 results in a smaller pattern length (N) than sub portion 24, and also either reduces or increases the number of energy injection events within the pattern depending on the difference between the feedback voltage and the desired voltage. In the embodiment the maximum number of energy injections events will be the number of resonant frequency cycles in the pattern duration or length, each energy injection event coinciding with a positive half cycle of the resonant frequency cycle. The minimum number of energy injection events is zero, with the actual number of energy injection events required within that range and adjusted according to the feedback voltage. In other embodiments both positive and negative half cycles may be used with appropriate switching configurations as will be known to those skilled in the art. A similar process occurs in sub portion 24 where a longer duration pattern or number of resonant frequency cycles is available to the maximum number of energy injection events.

Alternative algorithms for determining the duration of an energy injection switching pattern dependent on a system parameter could be used, as would now be apparent to those skilled in the art.

Turning now to FIG. 6, the inputs N (pattern duration) and n (number of energy injection events in the pattern) have already been determined from the flow chart in FIG. 5 and the FIG. 6 algorithm generates the distribution of energy injection events within the pattern which is implemented. Initialization is shown in step 30. In step 31 the power flow within the given pattern is determined to see whether it is greater or less than 50 percent i.e. whether the number of injection events in the given pattern length is greater than 50 percent. If it is greater than 50 percent then the corresponding long [100000] and short [1000] sub patterns are determined in step 32. If it is less than 50 percent then corresponding long [01111] and short [0111] sub patterns are determined in step 33. The long and short sub patterns are combined in the sub-algorithm 35 in order to generate the full pattern. This energy injection switching pattern is then provided to the Gate driver circuits in step 40.

Alternative algorithms for determining the distribution of energy injection events within the energy injection switching pattern could be used, as would now be appreciated by those skilled in the art.

Such algorithms provide the distribution of energy injection events in the pattern, for example whether energy injection events are bunched at the start of the pattern, towards the end, distributed evenly throughout the pattern or adjusted in other ways. The distribution of energy injection events within the pattern may be used to achieve various aims including increasing efficiency, reducing stress on switching components, reducing electromagnetic interference, or to allow for communication as will be described in more detail below.

In an embodiment the pattern generator can be arranged to distribute energy injection events substantially evenly throughout the pattern which have the effect of decreasing the crest factor (peak to RMS ratio) of the resonant wave forms when compared to other patterns (e.g. when all energy injection events are bunched at the start of a pattern). This is demonstrated in FIG. 8 showing a pattern of duration 16 resonant cycles at a coupling K of 0.26. Wave forms with lower crest factor are beneficial as this reduces the peak current/voltage stress of the resonant capacitor and converter switches, which mean that smaller and faster components may be used. In addition the magnitude of low frequency harmonics caused by the period or duration of the pattern is reduced, due to lower peak voltages and currents. A further advantage of more evenly distributing the energy injection events over the pattern rather than bunching is to allow a wider practical control range. In order for the energy injection circuitry to stay soft-switched it must detect the zero crossings of the primary resonant current. However if this current dampens to levels such that the zero crossings can no longer be detected, then the switching signal is lost and is not recoverable. FIG. 7a shows the minimum injection ratio that a sub optimal or bunched 16 cycle switching pattern can practically operate at is 5/16 for a coupling K of 0.32 (9 mm separation). In other words the lowest number of energy injection events that can tolerated is 5 where the pattern duration is 16 cycles. Whereas for a more even or uniform distribution of energy injection events, a lower number of energy injections can be tolerated thereby providing improved control resolution of the power flow particularly when in steady state conditions having longer duration patterns. FIG. 7b shows the minimum injection ratio being improved to 2/16 for such a distribution. As noted this can be used to improve efficiency and reduce component stresses. Example patterns include: 1111111100000000 and 1010101010101010. Both patterns add the same energy to the resonant circuit, but the second pattern has a more even distribution of energy injection events resulting in some of the advantages already discussed.

By providing a dynamically variable window length of the pulse train or in other words duration of the energy injection event switching pattern, the system can adapt to different conditions such as transient load or coupling conditions or more steady state conditions. A short window or pattern duration allows faster updates to the pulse patterns, whereas a longer window slows down the response time. By shortening the window length more dramatic changes in the regulated parameter will be made in a shorter amount of time providing a quick response time to correct a change in coupling or load. By extending the window length finer changes in the regulated parameter can be made to provide best circuit performance in terms of efficiency, load stability, minimal error between set point and actual load voltage. Although the above described embodiment uses only a short and long window, various duration patterns can be employed, with the length of the window being varied dynamically depending on system conditions. In times of change a fast but coarse response can be generated using a short window, and then as the system appears to stabilise the window length can be extended with longer and longer duration patterns used in order to provide fine tuning of the control parameter. The window length may also be determined by the prevailing specific load and coupling parameters in real time. For example, if power delivery to the load for the prevailing coupling happens to be well served by a window pattern of 1010101010, then the window can be reduced to 2, and the pattern 10 generated. This will provide the same level of control as well as a quick response when the prevailing conditions change. If however the prevailing conditions demand a pattern of 111111110, then the window cannot be shortened without reducing the resolution of the control.

In other embodiments the use of different distributions of energy injection events for the same window length can be employed to provide a communications channel from the primary to secondary of the IPT system. For a pattern duration of six cycles, the following distribution of energy injection events will provide the same additional energy, 111000; 101010; 000111; 010101. By switching patterns, a signal may be provided to the secondary with for example one of the above patterns representing a binary "1", and a second of the above patterns representing a binary "0". Similarly an EMC improvement may be implemented by selecting from the available patterns. At the secondary circuit, a peak detection circuit may be employed to identify that an energy injection has occurred on a cycle by cycle basis, so that the secondary circuit can decode the difference between the 111000 and 101010 patterns while receiving the same mean level of power. The two patterns can be referred to as communication partners where the power transfer is the same, but they facilitate digital information exchange.

The two patterns of FIG. 7 have different crest factors as previously described, which means that the primary (and consequently secondary) voltages and currents will be different for these two example patterns. Thus the change in pattern can be detected at the secondary as an amplitude modulation of the pick up voltages and currents. The pick up voltage could then be demodulated using conventional methods to receive the digital data stream from the primary. As an example the voltage received could be envelope detected to extract the envelope of the modulated wave form and zero cross detected in order to receive the binary data stream at the secondary side. Other modulation and detection methods are possible which would be apparent to the skilled person.

The harmonics generated from switching the pattern 111000 will be different from the harmonics generated from switching 101010, and the changing from one pattern to a different pattern can be used to spread out the electromagnetic emissions from the system and lower the peak values of emissions at specific frequencies.

The above described energy injection events distribution mechanism can be employed together with the variable pattern window or duration, or can be used independently of this together with patterns of fixed duration.

In a further embodiment, the pattern generation mechanisms described above can be used to control or regulate the power on the secondary side of the IPT system using shorting control (parallel tuned pickup) or opening control (series tuned pickup). A shorting control circuit is shown in FIG. 9. L2 and C2 are the pickup and tuning capacitor, and S is the shorting control switch. In one embodiment S can be implemented as back to back MOSFETs as shown in FIG. 10. In another embodiment S can be implemented using the lower two switches of a synchronous rectifier (S3 and S4) which when both conducting short the pickup (FIG. 11). Other topologies are possible which would now be apparent to those skilled in the art can be used to perform the same shorting control function. For the shorting control case the "1" in the energy regulating switching pattern can be implemented to switch off the shorting control elements allowing power to flow to the load. A "0" is then implemented to switch on the switches, their conducting stopping power flowing to the load.

Equivalently opening control can be implemented, for example using the circuit of FIG. 12, although other topologies are possible as would be appreciated by those skilled in the art and which perform the same opening control function. When considering opening control the pattern generator's "1" could be implemented to switch on the MOSFETs (or other switch types) to enable conducting power to the load. A "0" in the regulating pattern disconnects the load.

Using regulating patterns having different durations on the secondary side and which are dependent a system parameter such as load voltage provides the same benefits as applying the control technique to the primary side. For instance, short patterns can be used when fast transient response is required to regulate the output power at start-up or under load change. The controller can generate longer patterns when precise control of the output is necessary or when a steady state has been reached.

As with primary control, the property that there are many patterns that can deliver the same power to the load can be used for communicating data from the secondary to the primary. The plurality of patterns that allow the same power to be received at the secondary when using secondary control can be used to modulate the primary waveforms through the mutual inductance. Loading and unloading of the primary (via mutual inductance) leads to modulation of the primary waveforms allowing data to be transmitted to the primary from the secondary. Similar to primary control, there are patterns that can be applied to the secondary that apply lower stress to the systems switching components because of the lower crest factor. Thus applications of the control at the secondary can reduce component cost or increase system efficiency. Further, changing between equivalent patterns can spread the electromagnetic emissions from the system over a greater frequency range. This reduces the peak noise spectrum that the system produces making it easier to achieve electromagnetic compatibility.

In a further embodiment, communication from the primary to the secondary (and back in duplex systems) can be achieved with different duration patterns, for example a short energy injection switching pattern being interpreted as a "1" and a long pattern interpreted as a "0" in the communications system. This may be used together with other aspects or embodiments here described, or as a stand-alone arrangement.

The invention therefore provides an effective control method or system for an IPT system or an IPT system primary power supply.

The terms "inductive power transfer" can be substituted with "transcutaneous energy transfer" which is commonly used terminology when referring to powering of implanted medical devices.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A method for controlling an Inductive Power Transfer (IPT) system primary power supply having a switched resonant circuit; the method comprising:

determining the value of a parameter of the system;

determining a duration for an energy injection switching pattern comprising a plurality of cycles of a resonant frequency of the switched resonant circuit dependent on the parameter value;

determining the energy injection switching pattern; and controlling one or more switches of the resonant circuit according to the determined energy injection switching pattern.

2. The method according to claim 1, wherein a number and/or distribution of the energy injection events in the injection switching patterns is dependent on the parameter value.

3. The method according to claim 2, wherein the distribution of energy injection events in a series of patterns is changed in order to modulate the power transferred to a secondary, whilst maintaining the same number of energy injection events in each pattern in the series.

4. The method according to claim 1, wherein the duration comprises a pattern length having a number of cycles of the resonant frequency of the circuit.

5. The method according to claim 4, wherein the number of cycles of the pattern length is a predetermined number when the parameter value is below a threshold and a higher number otherwise.

6. The method according to claim 5, wherein a number of patterns having different numbers of cycles are provided, and wherein selecting between the provided patterns is dependent on the variation in the parameter value over time.

7. The method according to claim 1, wherein the resonant circuit is controlled dependent on an error determined by comparing the value of a parameter of the system with a required value.

8. The method according to claim 1, wherein the parameter of the system is indicative of a power output or power availability.

9. A method of charging an implanted medical device by controlling an Inductive Power Transfer (IPT) system primary power supply having a switched resonant circuit according to claim 1.

10. An Inductive Power Transfer (IPT) system primary power supply having a switched resonant circuit, and comprising a controller configured to:

receive the value of a parameter of the system;

determine a duration for an energy injection switching pattern comprising a plurality of cycles of a resonant frequency of the switched resonant circuit dependent on the parameter value;

determine the energy injection switching pattern; and control one or more switches of the switched resonant circuit according to the determined energy injection switching pattern.

11. The supply according to claim 10, the switched resonant circuit having a plurality of switches controlled by the determined energy injection switching pattern.

12. The supply according to claim 10, further comprising means for determining an error by comparing the value of a parameter of the system with a required value, and the means for determining an energy injection switching pattern is arranged to determine the duration dependent on the error.

13. The supply according to claim 10, wherein the duration comprises a pattern length having a number of cycles of the resonant frequency of the circuit, and wherein the pattern comprises a number and/or distribution of energy injection events in the injection switching patterns is dependent on the parameter value, the energy injection events being dependent on the resonant frequency cycles.

14. A charger for an implantable medical device having an Inductive Power Transfer (IPT) system primary supply according to claim 10.

15. A computer program product comprising instructions which when executed on a computer implement the method for controlling an Inductive Power Transfer (IPT) system primary power supply according to claim 9.

\* \* \* \* \*